United States Patent [19]

Hamada et al.

[11] 4,431,701

[45] Feb. 14, 1984

[54] SILICONE RUBBER COVERED ELECTRICAL CONDUCTOR

[75] Inventors: Mitsuo Hamada; Sadami Yasuda, both of Chiba, Japan

[73] Assignee: Toray Silicone Company, Ltd., Tokyo, Japan

[21] Appl. No.: 301,506

[22] Filed: Sep. 14, 1981

[30] Foreign Application Priority Data

Oct. 6, 1980 [JP] Japan ................ 55-139580

[51] Int. Cl.³ .................. B32B 15/06; B32B 25/04
[52] U.S. Cl. ................... 428/379; 174/110 S; 428/390; 428/391
[58] Field of Search ............ 428/375, 379, 390, 391; 174/110 S; 427/118, 120

[56] References Cited

U.S. PATENT DOCUMENTS

| | | | |
|---|---|---|---|
| 3,162,722 | 12/1964 | Bartos | 174/110 S |
| 3,566,009 | 2/1971 | Lamond | 174/110 S X |
| 3,588,318 | 6/1971 | Ollis | 174/110 S X |
| 4,145,505 | 3/1979 | Endstra | 528/10 |
| 4,243,542 | 1/1981 | Mine | 174/110 S X |

FOREIGN PATENT DOCUMENTS 872303  6/1971  Canada .

*Primary Examiner*—Lorraine T. Kendell
*Attorney, Agent, or Firm*—Roger H. Borrousch; Edward C. Elliott

[57] ABSTRACT

A silicone rubber covered electrical conductor is described which has good insulative resistance and is easily stripped for termination. The silicone rubber used as the insulation comprises an organopolysiloxane, a silica filler, zinc oxide or a zinc salt of a fatty acid, and orthochlorobenzoyl peroxide.

6 Claims, No Drawings

SILICONE RUBBER COVERED ELECTRICAL CONDUCTOR

BACKGROUND OF THE INVENTION

1. Field of the Invention

This invention relates to silicone rubber covered electrical conductors, and in particular, a silicone rubber covered electrical conductor which is characterized by the fact that a metallic conductor is covered with a composition of specific components and vulcanized to a silicone rubber.

2. Description of the Prior Art

Because silicone rubber is an exceptionally useful substance, being an electrical insulator and long lasting, it has conventionally been used as a material for covering electrical conductors. In general, silicone rubber covered electrical conductors are manufactured by extruding a rubber forming composition over an electrical conductor with an extruder and then curing the rubber forming composition by heating. It is normal practice to post cure the cured, insulated conductor, a second heat treatment, to remove the decomposition residues of the vulcanizing agents and to improve the electrical insulating properties. However, in the process of this second heat treatment, the cured silicone rubber layer and the electrical conductor adhere to one another. This adhesion becomes important when the ends of the electrical conductor are to be connected, because it is difficult to strip the silicone rubber layer from the end of the electrical conductor and silicone rubber residue remains on the conductor. Therefore, when the ends of such electrical conductors are connected, the contact is poor between the conductors which causes inferior electrical flow.

Conventionally, in removing the decomposition residues, the treatment conditions of the second heating have been inappropriately long at low temperatures, or short at high temperatures. This has been a rather great deterrent in the manufacture of silicone rubber covered electrical conductors.

In Canadian Pat. No. 872,303, issued Jan. 1, 1971, Compton described heat vulcanizable silicone rubber compositions which released from metal surfaces when they contained from 0.05 to 2 parts by weight of a metal salt of a carboxylic acid. An example shows zinc stearate as release agent and 2,5-bis-(tert-butylperoxide)-2,5-dimethylhexane as catalyst. Compton teaches that the compositions will release from a metal mold after vulcanization in the mold and the molded silicone rubber part can be removed without the use of a mold release material.

U.S. Pat. No. 4,145,505, issued Mar. 20, 1979, to Endstra teaches a cross-linkable composition consisting essentially of an organopolysiloxane and bis(o-chlorobenzoyl)peroxide. The composition is cross-linked by heating.

SUMMARY OF THE INVENTION

In order to correct the problems in the conventional techniques of manufacturing silicone rubber covered electrical conductors, the present inventors have assiduously carried out research, and as a result they have arrived at the discovery of an excellent, electrically insulated, covered electrical conductor. This conductor has excellent stripability, and even though the second heat treatment to cure the silicone rubber layer is carried out for a long time at high temperatures, the cured silicone rubber layer does not adhere to the electrical conductor.

This invention relates to a silicone rubber covered electrical conductor comprising a metallic conductor covered with silicone rubber which is made from a composition comprising (1) 100 parts by weight of diorganopolysiloxane having an average unit formula $$R_a SiO_{\frac{4-a}{2}}$$

wherein R is a monovalent radical selected from the group consisting of monovalent hydrocarbon radicals, halogenated monovalent hydrocarbon radicals, and cyanoalkyl radicals, and a is 1.90 to 2.002; (2) 5 to 100 parts by weight of a silica filler in powdered form; (3) 0.05 to 20 parts by weight of zinc oxide or a zinc salt of a fatty acid having at least 8 carbon atoms; and (4) 0.1 to 5 parts by weight of orthochlorobenzoyl peroxide.

DESCRIPTION OF THE INVENTION

The electrical conductor can be metals which are good electrical conductors, including copper, tin-plated copper, aluminum, silver, alloys thereof, and galvanized metals. The electrical conductor can be of any shape such as wires, poles, bars, and tubes. The conductor can be of any cross section such as circular, oval, triangular, square, or doughnut shaped. It is permissable to use single strands or complex combinations of wires.

In the silicone rubber composition which is used in the present invention, component (1) is an organopolysiloxane which is expressed by the average unit formula $$R_a SiO_{\frac{4-a}{2}}$$

in which R is a monovalent hydrocarbon radical, a halogenated monovalent hydrocarbon radical, or a cyanoalkyl radical, and a is 1.90 to 2.002. Examples of monovalent hydrocarbon radicals are alkenyl radicals such as butyadienyl, allyl, and vinyl; aryl radical such as phenyl; aralkyl radical such as 2-phenylethyl; and alkyl radicals such as ethyl, propyl, and methyl. Examples of halogenated monovalent hydrocarbon radicals are 3,3,3-trifluoropropyl and 3-chloropropyl. An example of a cyanoalkyl radical is 2-cyanoethyl. The molecules can be straight chains or branched chains, and the chain terminating groups can be either trioganosilyl groups or hydroxyl groups. Examples of the triorganosilyl groups are trimethylsilyl, dimethylvinylsilyl, methylphenylvinylsilyl, and methyldiphenylsilyl. There is no particular limitation on the degree of polymerization, but from the point of view of the magnitude of the strength after curing, the polymer should be a gum at room temperature, namely a degree of polymerization of greater than 1000. The preferred organopolysiloxane is a gum consisting essentially of dimethylsiloxane units and methylvinylsiloxane units.

Component (2) is a silica filler in powdered form which serves the purpose of a strengthener, adds viscosity, and improves handling. The silica filler is a powder which has silica as its main ingredient and examples are fumed silica, precipitated silica, fumed and precipitated silica which have had their surfaces treated to make them hydrophobic, quartz dust, and diatomaceous earth. The preferred filler is fumed silica in an amount of from 20 to 60 parts by weight per 100 parts by weight of (1).

Component (3) is zinc oxide or a zinc salt of a fatty acid having at least 8 carbon atoms. The purpose of this component is to inhibit the adhesion of the cured silicone rubber to the electrical conductor during the second heat treatment. Examples of the zinc salt of a fatty acid are zinc stearate, zinc palmitate, zinc laurate, zinc octoate, and zinc oleate. The preferred material for component (3) is zinc oxide in an amount of from 0.05 to 5 parts by weight per 100 parts by weight of (1).

Component (4) is orthochlorobenzoyl peroxide which is a curing agent for the silicone rubber composition. It is the general practice to use 2,4-dichlorobenzoyl peroxide or parachlorobenzoyl peroxide as the curing agent in the curing of silicone rubber compositions for applications in covering electrical conductors. When zinc oxide or zinc salts of fatty acids are used in a silicone rubber composition containing 2,4-dichlorobenzoyl peroxide or parachlorobenzoyl peroxide, the resulting cured silicone rubber has reduced electrical insulation properties. By using the orthochlorobenzoyl peroxide in combination with component (3), it has been unexpectedly found that the electrical insulation properties are not reduced. The preferred amount of orthochlorobenzoyl peroxide is from 0.5 to 5 parts by weight per 100 parts by weight of (1).

A preferred embodiment is a silicone rubber covered electrical conductor in which the metallic conductor is selected from copper, tin-plated copper, or aluminum. The silicone rubber is made from a composition in which the organopolysiloxane is a polydiorganosiloxane gum having dimethylsiloxane units and methylvinylsiloxane units. Component (2) is fumed silica in an amount of from 20 to 60 parts by weight. Component (3) is zinc oxide in an amount of from 0.05 to 5 parts by weight. The orthochlorobenzoyl peroxide is present in an amount of from 0.5 to 5 parts by weight.

Besides the four components given above, it is also permissible to add, according to necessity, pigments, heat-resistant agents such as iron oxides, rare earth metallic compounds, titanium oxide, or carbon black, or to add combustion retardants such as platinum compounds, and/or carbonates of heavy metals. In addition, it is permissible, according to circumstance, to add organosilane or diorganopolysiloxanes having low degrees of polymerization used in the treatment of the surface of the silica filler in powder form. Although it is the general practice to use one kind only of each of the components (1) through (3), there is certainly nothing wrong with using two or more in combination.

Although it is easy to produce this silicone rubber compound by using a mixer, or a two-roll mill to blend the components (1) through (4) uniformly, it is also possible to first mix components (1) and (2) or components (1) through (3) by means of a kneader mixer or a Banbury mixer, then add in the components (3) and (4) or component (4) respectively, by means of a two-roll mill, as is the general practice; but of course the methods of mixing are not restricted to these.

In covering the electrical conductor with the silicone rubber, it is possible to use the methods which are conventionally well known, namely, to coat the electrical conductor with the silicone rubber composition in a single operation by an extruder, then immediately curing it in a hot air furnace, or to place both the electrical conductor and the silicone rubber composition in a metal mold, and then carry out press vulcanization. As far as the conditions of curing are concerned, in a hot air furnace, it is best that they be 200°–500° C. for 10 seconds to 30 minutes. In the case of press vulcanization, it is best that they be 90°–140° C. for 0.5–20 minutes. As the second heat treatment in order to remove the decomposition residues of component (4), it is best that this be carried out in a hot air recycling furnace at 200°–250° C. for 30 minutes to 4 hours.

A silicone rubber covered electrical conductor produced according to this invention combines the desired properties of easy stripability for termination and excellent insulative properties. Both of these characteristics are needed properties in rubber insulated electrical conductors.

The following examples are illustrative only and should not be construed as limiting the present invention which is properly delineated in the appended claims. In the examples, the term "parts" means "parts by weight."

EXAMPLE 1

A mixture was made by uniformly mixing 100 parts of an organopolysiloxane gum composed of 99.8 mol % dimethylsiloxane units, 0.2 mol % methylvinylsiloxane units, and endblocked with dimethylvinylsiloxy units, and having a degree of polymerization of 3000, 5 parts of a hydroxyl endblocked polydimethylsiloxane having a degree of polymerization of 10, and 55 parts of fumed silica which had a specific surface area of 200 $m^2/g$. This mixture was heat-treated at 150° C. for two hours and was thereby made into a base composition. To 100 parts of this base composition were added zinc stearate and organic peroxides as shown in Table I, and then these compositions were mixed uniformly by means of a two-roll mill to produce silicone rubber composition. The silicone rubber composition was supplied to a cylinder extruder with an inside diameter of 2 inches, and extruded onto a tin-plated copper core wire composed of 7 strands where each strand had a 0.26 mm diameter, to a wall thickness of 1 mm. After the core wire was coated, it was continuously heated and cured for 30 seconds in a 400° C. hot air furnace, and thereby became a silicone rubber covered electrical wire. The silicone rubber covered electrical wire which was obtained in this manner had an insulative resistance determined in accordance with JIS-C-3004, as shown in Table I. After it had been heated to 220° C., at specified intervals, samples were taken and allowed to cool; then an electrical wire stripper was used to strip off the silicone rubber layer, and a standard of stripability was established on the basis of the heating time (minutes) that it took until it was impossible to strip off the silicone rubber layer. The results are shown in Table I. Although the insulative resistance and the stripability of the present invention were excellent, it can be seen that both the insulative resistance and the stripability of the comparative examples were inferior in both respects.

TABLE I

| | The Present Invention | Comparative Examples | | | |
|---|---|---|---|---|---|
| Base Composition (parts) | 100 | 100 | 100 | 100 | 100 |
| Zinc stearate (part) | 0.25 | — | 0.25 | — | 0.25 |
| Orthochlorobenzoyl peroxide (part) | 0.9 | 0.9 | — | — | — |
| 2-4dichlorobenzoyl peroxide (part) | — | — | 0.9 | 0.9 | — |
| Parachlorobenzoyl | — | — | — | — | 0.9 |

TABLE I-continued

|  | The Present Invention | Comparative Examples | | | |
|---|---|---|---|---|---|
| peroxide (part) |  |  |  |  |  |
| Insulative resistance (Megohm-Km) 20° C. | 10,000 | 9,500 | 500 | 9,000 | 350 |
| Heating time (minutes) before it was impossible to strip off the hardened silicone rubber layer from the core wire | 700 | 60 | 420 | 60 | 300 |

EXAMPLE 2

To 100 parts of the base composition of Example 1 were added zinc oxide and organic peroxides as shown in Table II, which were then mixed until they were uniformly kneaded together by a two-roll mill. Compositions were made in the same manner as in Example 1 into silicone rubber covered electrical wires, and the insulative resistance and stripability were evaluated under the same methods and conditions. The results can be seen in Table II.

Although the insulative resistance and stripability of the present invention were excellent, it can be seen that the insulative resistance and stripability of the comparative examples were inferior in both respects.

TABLE II

|  | The Present Invention | | Comparative Examples | |
|---|---|---|---|---|
| Base compound (parts) | 100 | 100 | 100 | 100 |
| Zinc oxide (part) | 0.5 | 0.5 | — | — |
| Orthochlorobenzoyl peroxide (parts) | 1.0 | — | 1.5 | — |
| 2,4-dichlorobenzoyl peroxide (parts) | — | 1.0 | — | 1.5 |
| Insulative Resistance (Megohm-Km) 20° C. | 9,800 | 500 | 10,000 | 9,000 |
| Heating time (minutes) before it is impossible to strip off the hardened silicone rubber layer from the core wire | 600 | 420 | 60 | 120 |

EXAMPLE 3

A mixture was made by uniformly mixing 100 parts of an organopolysiloxane gum composed of 90.5 mol % of dimethylsiloxane units, 9.0 mol % of methylphenylsiloxane units, and 0.5 mol % of methylvinylsiloxane units endblocked with dimethylvinylsiloxy units, and having a degree of polymerization of 2900, 3 parts of hydroxyl endblocked polydimethylsiloxane having a degree of polymerization of 10, and 45 parts of a precipitated silica which had specific surface area of 200 m²/g. This mixture was made into a base composition by heat treatment for two hours at 150° C.

To 100 parts of the base composition, zinc oxide and organic peroxides were added as shown in Table III; then these compositions were kneaded to uniformity by a two-roll mill, and were then tested as in Example 1. The insulative resistance and the stripability were evaluated under the same conditions and same methods as described in Example 1, and the results are shown in Table III.

The present invention had a better stripability than that of the comparative examples, and the insulative resistance was also somewhat better.

TABLE III

|  | The Present Invention | Comparative Examples |
|---|---|---|
| Base composition (parts) | 100 | 100 |
| Zinc oxide (parts) | 2.0 | — |
| Orthochlorobenzoyl peroxide (parts) | 1.2 | 1.2 |
| Insulative resistance (Megohm-Km) 20° C. | 3,000 | 2,500 |
| Heating time (minutes) before it is impossible to strip off the hardened silicone rubber layer from the core wire | 420 | 60 |

That which is claimed is:

1. A silicone rubber covered electrical conductor consisting essentially of a metallic conductor covered with a stripable silicone rubber which is made from a composition comprising
   (1) 100 parts by weight of organopolysiloxane having an average unit formula $$R_a SiO_{\frac{4-a}{2}}$$

wherein R is a monovalent radical selected from the group consisting of monovalent hydrocarbon radicals, halogenated monovalent hydrocarbon radicals, and cyanoalkyl radicals, and a is 1.90 to 2.002;
   (2) 5 to 100 parts by weight of a silica filler in powdered form;
   (3) 0.05 to 20 parts by weight of zinc oxide; and
   (4) 0.1 to 5 parts by weight of orthochlorobenzoyl peroxide.

2. The conductor of claim 1 in which the composition contains fume silica as (2).

3. The conductor of claim 1 in which the composition contains a polydiorganosiloxane having a portion of the R groups being vinyl groups.

4. The conductor of claim 2 in which the composition contains from 20 to 60 parts by weight of fume silica as (2).

5. The conductor of claim 3 in which the composition contains from 0.05 to 5 parts by weight of zinc oxide.

6. The conductor of claim 1 in which the metallic conductor is selected from copper, tin-plated copper, or aluminum; the organopolysiloxane is a polydiorganosiloxane gum having dimethylsiloxane units and methylvinylsiloxane units; (2) is from 20 to 60 parts by weight of fumed silica filler; (3) is from 0.05 to 5 parts by weight of zinc oxide; and (4) is from 0.5 to 5 parts by weight of orthochlorobenzoyl peroxide.

* * * * *